Feb. 9, 1937.     R. E. NELSON     2,070,172
RADIO BATTERY CABINET
Filed May 17, 1935     2 Sheets-Sheet 2

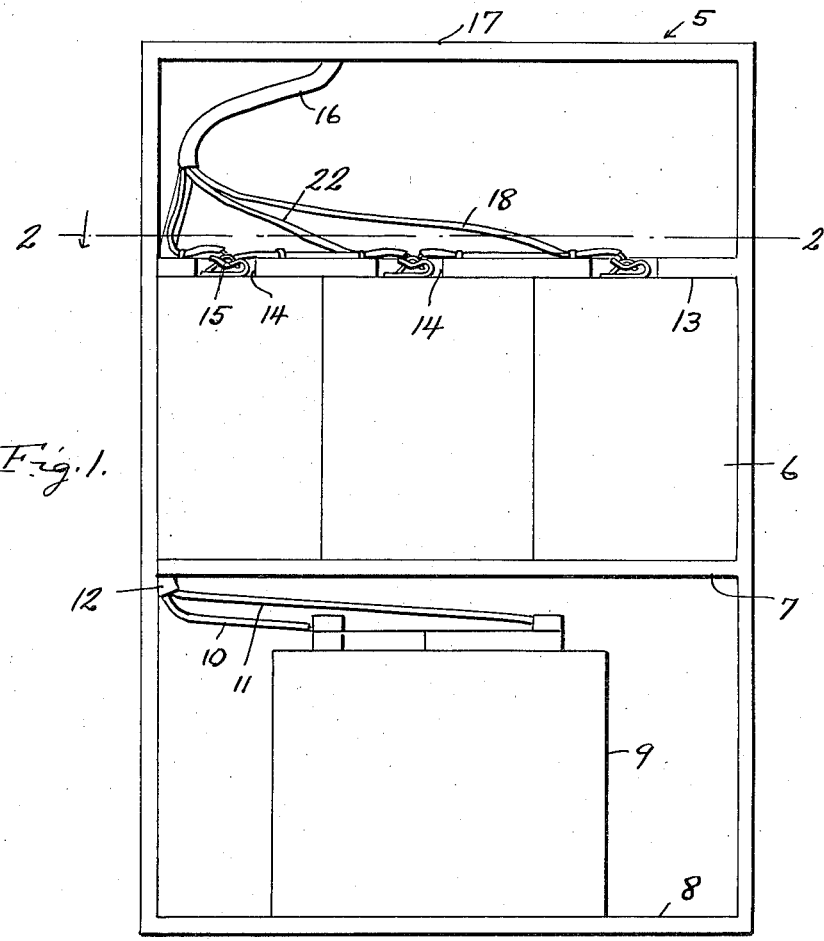
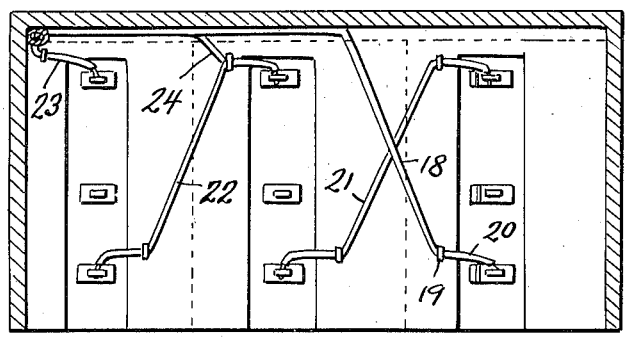

Inventor
Ray E. Nelson
By Clarence A. O'Brien
Attorney

Patented Feb. 9, 1937

2,070,172

UNITED STATES PATENT OFFICE 2,070,172

RADIO BATTERY CABINET

Ray Emonds Nelson, Cottage Grove, Oreg.

Application May 17, 1935, Serial No. 22,055

1 Claim. (Cl. 136—173)

My invention relates generally to means for containing and holding the "A" and "B" batteries for a radio set, and particularly to a cabinet for containing and holding in association the "A" and "B" batteries, so that the same will be compactly arranged in efficient relation, and an important object of the invention is to provide a cabinet of the character indicated which involves means to prevent improper installation of the "B" batteries, and which prevents improper connection of the wires after the "B" batteries have been installed.

Other important objects and advantages of my invention will be apparent from a reading of the following description in connection with the drawings wherein for purposes of illustration I have shown preferred embodiments of my invention.

In the drawings:—

Figure 1 is a front elevational view showing the cabinet with the back removed.

Figure 2 is a horizontal sectional view taken through Figure 1 approximately on the line 2—2 and looking downwardly in the direction of the arrows.

Figure 3:
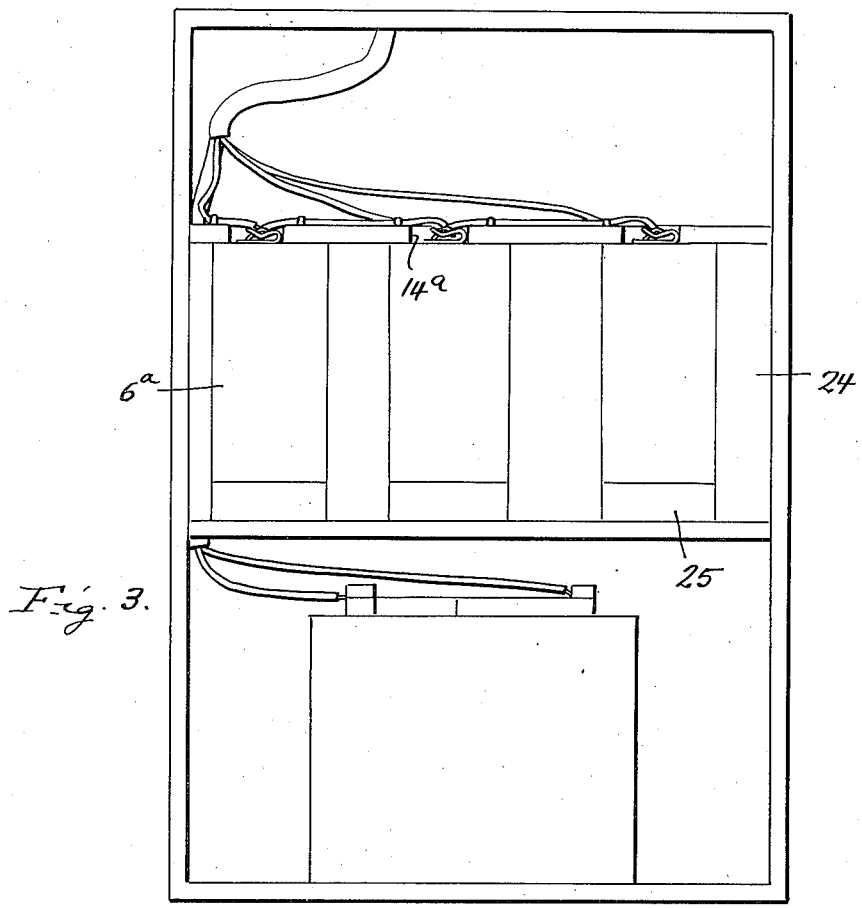
Figure 3 is a view similar to Figure 1 of another embodiment of the invention.

Referring in detail to the drawings, the numeral 5 generally designates a vertically elongated box-like structure of generally rectangular cross section and of a width and depth to closely receive three "B" batteries 6 on a shelf 7 which is sufficiently spaced above the bottom 8 to leave sufficient space for the "A" battery 9 which rests on the bottom 8.

The wires 10 and 11 which lead from the terminals of the "A" battery 9 are brought up through a conduit 12 through the shelf 7. A second shelf 13 is spaced above the shelf 7 sufficiently to engage or to be very close to the tops of the "B" batteries.

The shelf 13 is provided at longitudinal intervals with slots 14 which are sufficiently wide to receive the clips 15 on the tops of the "B" batteries.

The slots 14 open through the back edge of the shelf 13 and are of such a width and location as to closely receive the clips which are laterally offset in position toward one side of the "B" batteries, this arrangement of the clips on the batteries being conventional. Because of the offset position of the clips of the "B" batteries and the described arrangement of the slots 14, it is impossible to install the "B" batteries in the cabinet except in the correct position, wherein the clips have the proper relation to the connecting wires.

The connecting wires are led in through the insulating conduit 16 which traverses the top 17 of the cabinet and of which conduit the conduit 12 is a branch passing downwardly through the shelf 13. The wire 18 is brought from the conduit 16 and secured as indicated at 19 by means fastened to the top of the shelf 13 and with only a small end portion 20 free. This arrangement of the wire 18 prevents the possibility of the same being connected to any other one of the clips on the adjacent battery except the immediately adjacent battery clip. A jumper 21 is arranged to connect the two right hand "B" batteries, the wire 22 and the wire 23 as well as the wire 24 are similarly fastened to the top of the shelf 13 immediately adjacent the battery clips to which they relate. By reason of these arrangements, the mere proper installation of the "B" batteries brings the battery clips and the respective wires into their proper positions, the connection of the free ends of the wires requiring only the usual engagements with the clips.

Figure 4:
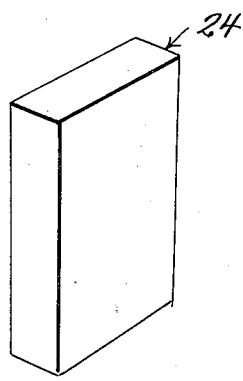
Figure 4 is a perspective view of one of the spacer or filler blocks.

Another embodiment of the invention shown in Figures 3 and 4 contemplates the use of smaller "B" batteries 6a. All other features of the embodiment shown in Figures 1 and 2 are contained in the embodiment shown in Figures 3 and 4, but in the second embodiment utilizing smaller "B" batteries 6a, I provide vertical spacer blocks 24 and horizontal spacer blocks 25, each of which blocks is of such a size as to properly take up the difference in size of the smaller "B" batteries and to dispose the "B" batteries so that the positioning of the blocks 14a will require proper installation of the batteries as is obtained in the present described embodiment.

Although I have shown and described herein preferred embodiments of my invention, it is to be definitely understood that I do not desire to limit the application of the invention thereto, and any change or changes may be made in the materials and in the structure and arrangement of the parts, within the spirit of the invention and the scope of the subjoined claim.

What is claimed is:—

In a cabinet structure, in combination with a plurality of electric batteries having binding posts, a horizontal partition in the cabinet dividing the interior of the cabinet into an upper and a lower compartment, the lower compartment being of a size to snugly receive the batteries, said partition being provided with transverse slots for receiving the binding posts, said partition being of a thickness sufficiently great so that the binding posts will not project above the top surface thereof.

RAY EMONDS NELSON.